United States Patent
Kang et al.

(10) Patent No.: US 8,355,568 B2
(45) Date of Patent: Jan. 15, 2013

(54) IMAGE PROCESSING APPARATUS, METHOD AND COMPUTER-READABLE MEDIUM

(75) Inventors: Byong Min Kang, Yongin-si (KR); Hwa Sup Lim, Hwaesong-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 353 days.

(21) Appl. No.: 12/844,242

(22) Filed: Jul. 27, 2010

(65) Prior Publication Data

US 2011/0110585 A1     May 12, 2011

(30) Foreign Application Priority Data

Nov. 10, 2009 (KR) .......................... 10-2009-0107980

(51) Int. Cl.
*G06K 9/34* (2006.01)
(52) U.S. Cl. ......... 382/164; 382/162; 382/190; 382/282
(58) Field of Classification Search .................. 382/162, 382/164, 190, 282; 345/419, 581; 348/37, 348/39, 50, 150; 358/537; 356/608; 250/559.23
See application file for complete search history.

(56) References Cited

U.S. PATENT DOCUMENTS

| | | | | |
|---|---|---|---|---|
| 6,028,673 A | * | 2/2000 | Nagasaki et al. | 356/608 |
| 6,504,569 B1 | | 1/2003 | Jasinschi et al. | 348/43 |
| 7,671,867 B2 | * | 3/2010 | Repin | 345/581 |

FOREIGN PATENT DOCUMENTS

| | | |
|---|---|---|
| JP | 7-287756 | 10/1995 |
| JP | 11-312228 | 11/1999 |
| JP | 2002008041 | * 1/2002 |
| JP | 2005-346297 | 12/2005 |
| JP | 2006-113738 | 4/2006 |
| KR | 10-2004-0000144 | 1/2004 |
| KR | 10-2006-0129332 | 12/2006 |
| KR | 10-2007-0060002 | 6/2007 |
| KR | 10-2008-0069601 | 7/2008 |
| KR | 10-2009-0006851 | 1/2009 |
| KR | 10-2009-0049438 | 5/2009 |

* cited by examiner

*Primary Examiner* — Anh Hong Do
(74) *Attorney, Agent, or Firm* — Staas & Halsey LLP

(57) ABSTRACT

Provided is an image processing apparatus, method and computer-readable medium. The image processing apparatus, method and computer-readable medium may extract a target object area from an input color image, based on an input depth image and the input color image. For the above image processing, the image processing may extract a silhouette area of a target object from the input depth image and refine the silhouette area of the target object based on the input color image.

20 Claims, 12 Drawing Sheets

IMAGE PROCESSING APPARATUS, METHOD AND COMPUTER-READABLE MEDIUM

CROSS-REFERENCE TO RELATED APPLICATIONS

This application claims the priority benefit of Korean Patent Application No. 10-2009-0107980, filed on Nov. 10, 2009, in the Korean Intellectual Property Office, the disclosure of which is incorporated herein by reference.

BACKGROUND

1. Field

One or more example embodiments relate to image processing technology that may extract, from an input image, a target object area such as a human body of a user, and more particularly, to technology that may perform modeling of a character or an avatar of a human for use with virtual reality, a three-dimensional (3D) TV, a 3D game, and the like.

2. Description of the Related Art

In a virtual reality or a virtual world, research on generating a modeled avatar of a user in a virtual world has been conducted. The research is gaining attention for use in conjunction with video games, movies, and the like.

The research has been conducted using separate expensive equipment, for example, equipment which three dimensionally scans a human body, and the like. However, the 3D scanning equipment is generally expensive, not portable and thus there are some constraints of using the 3D scanning equipment.

Accordingly, usage efficiency may increase when a user area, such as a human body area is extracted from a color image without using large and expensive equipment such as a 3D scanner.

In particular, image segmentation technology using only a depth image or only a color image while extracting a body area may have a limited effect in enhancing precision.

SUMMARY

The foregoing and/or other aspects are achieved by providing an image processing apparatus, including a first calculator to extract a silhouette area of a target object from an input depth image, and a second calculator to refine the silhouette area based on an input color image matching with the input depth image, and to extract a target object area from the input color image based on the refined silhouette area.

The target object may correspond to a human body.

The first calculator may include a floor removing unit to remove, from the input depth image, pixels corresponding to a horizontal plane, a depth value filtering unit to extract at least one silhouette candidate area of the target object by extracting, from the input depth image in which the pixels corresponding the horizontal plane are removed, an area having a depth value greater than or equal to a first threshold and less than a second threshold, and a silhouette extractor to select a silhouette area of the target object from the at least one silhouette candidate area of the target object.

The floor removing unit may estimate the horizontal plane by selecting at least three pixels from a bottom portion of the input depth image to obtain an equation of the horizontal plane, and may remove, from total pixels of the input depth image, pixels of which a distance from the horizontal plane is less than a third threshold.

The silhouette extractor may select, as the silhouette area of the target object, a silhouette candidate area having a largest number of pixels among the at least one silhouette candidate area of the target object.

The silhouette extractor may select, as the silhouette area of the target object, a silhouette candidate area being closest to a central point of the input depth image among the at least one silhouette candidate area of the target object.

The first calculator may further include a depth folding removing unit to remove, from the extracted at least one silhouette candidate area of the target object, a portion having an intensity value less than a fourth threshold, by referring to an input intensity image corresponding to the input depth image.

The second calculator may include a silhouette extender to generate an extended silhouette area of the target object by merging pixels of which a distance from outer pixels of the silhouette area of the target object is less than a fifth threshold, a histogram generator to calculate a color distribution of pixels corresponding to the extended silhouette area of the target object among pixels of the input color image, and to calculate a depth distribution of pixels corresponding to the extended silhouette area of the target object among pixels of the input depth image, a probability calculator to calculate a probability that each of pixels constituting the extended silhouette area of the target object belongs to the target object, based on the color distribution and the depth distribution, and a target object area extractor to extract the target object area from the input color image based on the calculated probability.

The image processing apparatus may further include a post-processor to refine the extracted target object area.

The image processing apparatus may further include an image matching unit to match the input depth image and the input color image when the input depth image and the input color image do not match.

The foregoing and/or other aspects are achieved by providing an image processing method, including extracting, using a processor, a silhouette area of a target object from an input depth image, and refining the silhouette area based on an input color image matching with the input depth image, and extracting, using the processor, a target object area from the input color image based on the refined silhouette area.

The foregoing and/or other aspects are achieved by providing at least one computer readable medium including computer readable instructions that control at least one processor to implement methods of one or more embodiments.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Figure 1:
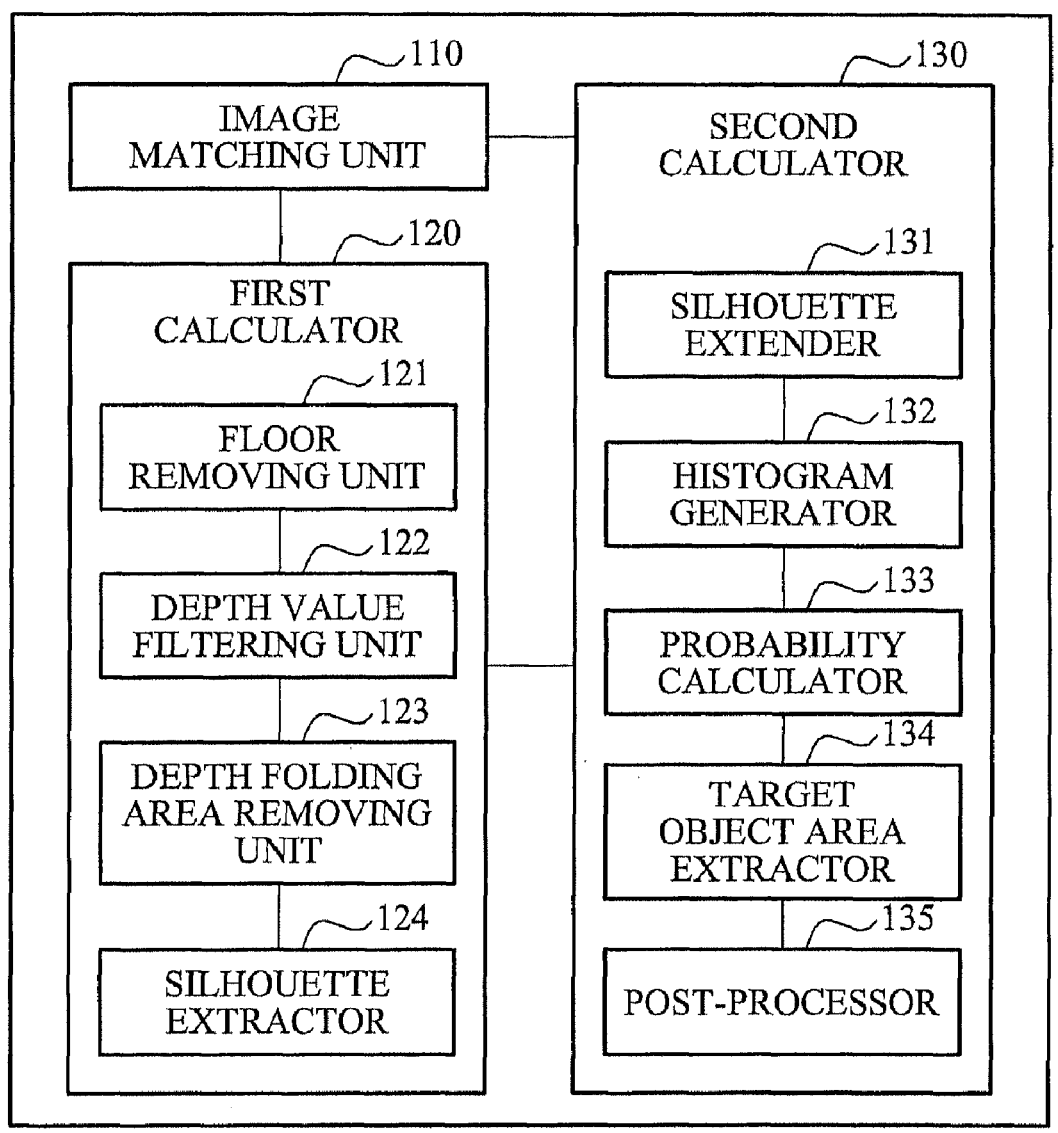
FIG. 1 illustrates an image processing apparatus according to example embodiments.

Reference will now be made in detail to embodiments, examples of which are illustrated in the accompanying drawings, wherein like reference numerals refer to like elements throughout. Embodiments are described below to explain the present disclosure by referring to the figures.

FIG. 1 illustrates an image processing apparatus 100 according to example embodiments.

A depth image and a color image may be input into the image processing apparatus 100. The input depth image may be matched with the input color image.

When the input depth image does not match the input color image, for example, when a resolution of the input depth image is different from a resolution of the input color image, or when a photographed viewpoint of the input depth image is different from a viewpoint of the input color image, an image matching unit 110 may match the input depth image with the input color image. An operation of the image matching unit 110 will be further described with reference to FIG. 3.

Hereinafter, it is assumed that the depth image and the color image are input after they match with each other, or in a matched state.

Referring to FIG. 1, a first calculator 120 may include a floor removing unit 121, a depth value filtering unit 122, a depth folding area removing unit 123, and a silhouette extractor 124. However, the above constituent elements are only an example. Therefore, depending on embodiments, a portion thereof may be omitted or another configuration not shown here may be further included.

The floor removing unit 121 may remove a floor area corresponding to a horizontal plane from the input depth image. The floor removing unit 121 may select at least three pixels included in a bottom portion of the input depth image. A plane equation may be obtained based on the selected at least three pixels.

With respect to each of the entire pixels included in the input depth image, the floor removing unit 121 may calculate a distance value between a point represented by spatial coordinates of a corresponding pixel and a plane represented by the plane equation. The floor removing unit 121 may treat pixels included in a floor area as pixels of which the calculated distance value is less than a predetermined threshold distance and remove the pixels. An operation of the floor removing unit 121 will be further described with reference to FIG. 4.

The depth value filtering unit 122 may further remove, from the input depth image in which the floor area is removed, pixels having a depth value outside a first range. The first range may be, for example, greater than or equal to a first threshold and less than a second threshold. An operation of the depth value filtering unit 122 will be further described with reference to FIG. 5.

The depth folding area removing unit 123 may remove a depth folding area from the input depth image, or may remove the depth folding area from a result in which the floor area is removed by the floor removing unit 121 and an area having a depth value outside the first range is removed by the depth value filtering unit 122.

The depth folding area and an operation of the depth folding area removing unit 123 will be further described with reference to FIG. 5.

Through the above process, a plurality of silhouette candidate areas of the target object may be extracted. The silhouette extractor 124 may select, as a silhouette area of the target object, one of the silhouette candidate areas of the target object.

Further descriptions will be made with reference to FIGS. 5 and 6.

A second calculator 130 may refine the extracted silhouette area of the target object.

The second calculator 130 may include a silhouette extender 131, a histogram generator 132, a probability calculator 133, a target object area extractor 134, and a post-processor 135.

Depending on embodiments, the above elements may be partially merged or a portion thereof may be omitted.

The silhouette extender 131 may generate an extended silhouette area of the target object by merging adjacent pixels of the extracted silhouette area of the target object to the silhouette area of the target object.

An operation of the silhouette extender 131 will be further described with reference to FIG. 7.

The histogram generator 132 may generate a histogram of depth values of pixels within the extended silhouette area of the target object and color histograms of color pixels corresponding to the histogram.

An operation of the histogram generator 132 will be further described with reference to FIG. 9.

With respect to each of the color pixels, the probability calculator 133 may calculate a probability that a corresponding color pixel may belong to the target object based on the histograms generated by the histogram generator 132.

The target object area extractor 134 may select pixels, belonging to the target object area, from pixels of the input color image based on the calculated probability.

The post-processor 135 may extract a final target object area by performing various types of post-processing operations with respect to the pixels, for example, removing an outlier, filling a hole, low pass filtering, and the like.

An operation of the target object area extractor 134 and the post-processor 135 will be further described with reference to FIG. 10.

Figure 2:
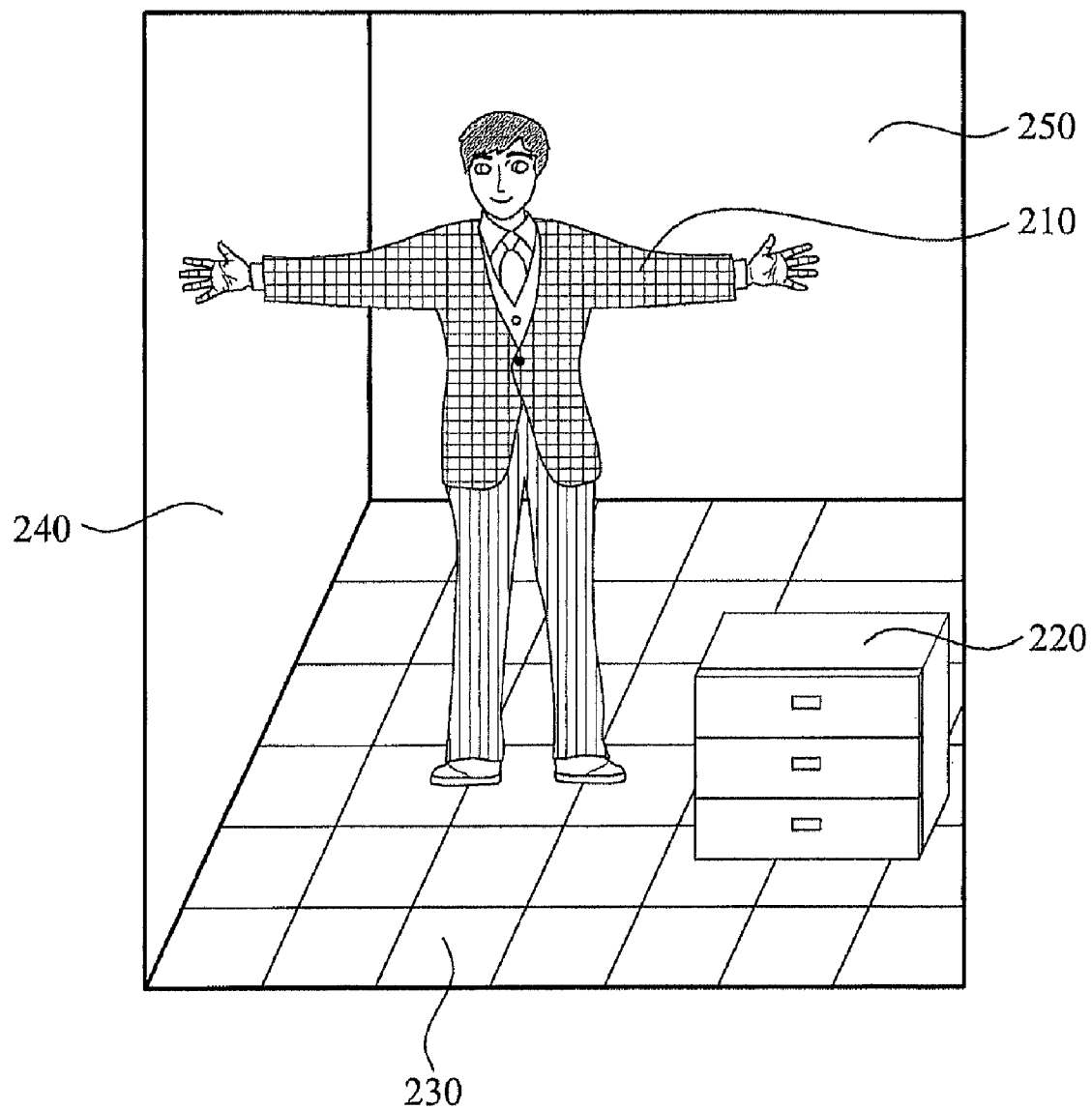
FIG. 2 illustrates an input color image according to example embodiments.

FIG. 2 illustrates an input color image 200 according to example embodiments.

A body area 210 that is a target object may be extracted from the input color image 200.

In addition to the body area 210, a drawer area 220, a floor area 230, wall areas 240 and 250, and the like may exist within the input color image 200.

Figure 3:
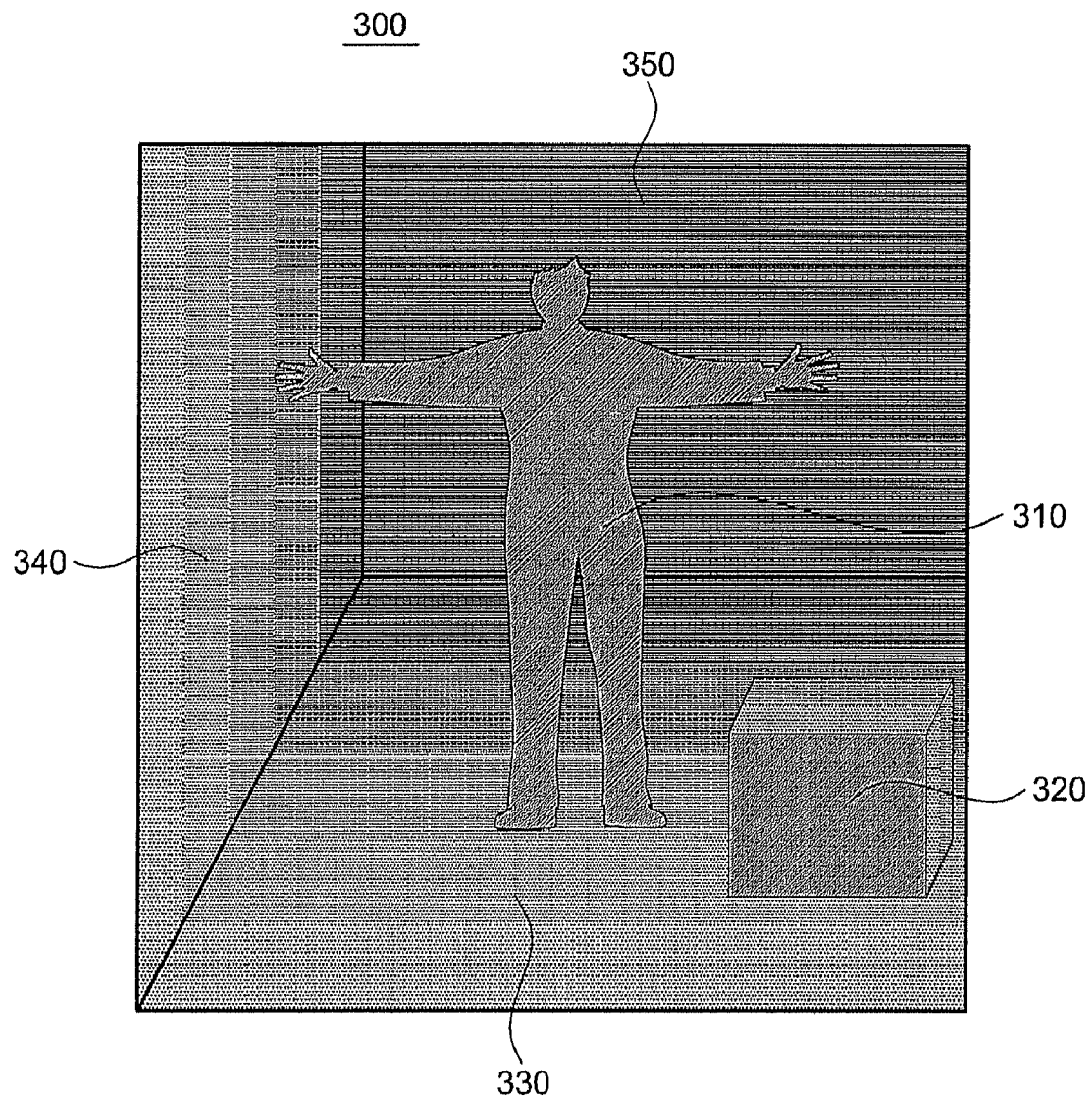
FIG. 3 illustrates an input depth image according to example embodiments.

FIG. 3 illustrates an input depth image 300 according to example embodiments.

The input depth image 300 may be matched with the input color image 200 of FIG. 2. For example, a resolution of the input depth image 300 may be the same as a resolution of the input color image 200, and pixels having the same index within the input color image 200 and the input depth image 300 may correspond to the same point of an object space.

According to another example embodiment, a depth image having a resolution less than the resolution of the input color image 200 and/or having a viewpoint different from the input color image 200 may be input into the image processing apparatus 100 of FIG. 1.

In this example, the image matching unit 110 may generate the input depth image 300 matched with the input color image 200 by increasing a resolution of the depth image and by performing an image matching process using a feature point extraction and comparison.

Accordingly, the input depth image 300 matched with the input color image 200 may be directly input into the image processing apparatus 100, or may be generated by the image matching unit 110.

In the latter example, the image matching unit 110 may generate the input depth image 300 matched with the input color image 200 by extracting a predetermined number of feature points from each of the input color image 200 and an input depth image (not shown) which do not match with the input color image 200, by calculating a transformation function or a transformation matrix between the extracted feature points, and by applying the transformation function or the transformation matrix to the entire pixels.

The feature points may be extracted using a general image processing algorithm including an edge detection process.

Hereinafter, as an example, the input depth image 300 is directly input into the image processing apparatus 100, an operation of the image processing apparatus 100 will be described. However, as described above, it is only an example and a depth image which does not match with an input color image may be input into the image processing apparatus 100.

The input depth image 300 may include a silhouette area 310 of a target object that is a human body, a drawer area 320, a floor area 330, wall areas 340 and 350, and the like.

The first calculator 120 may extract the silhouette area 310 of the target object from the input depth image 300.

A process of extracting the silhouette area 310 of the target object by the first calculator 120 will be described with reference to FIGS. 4 through 6.

Figure 4:
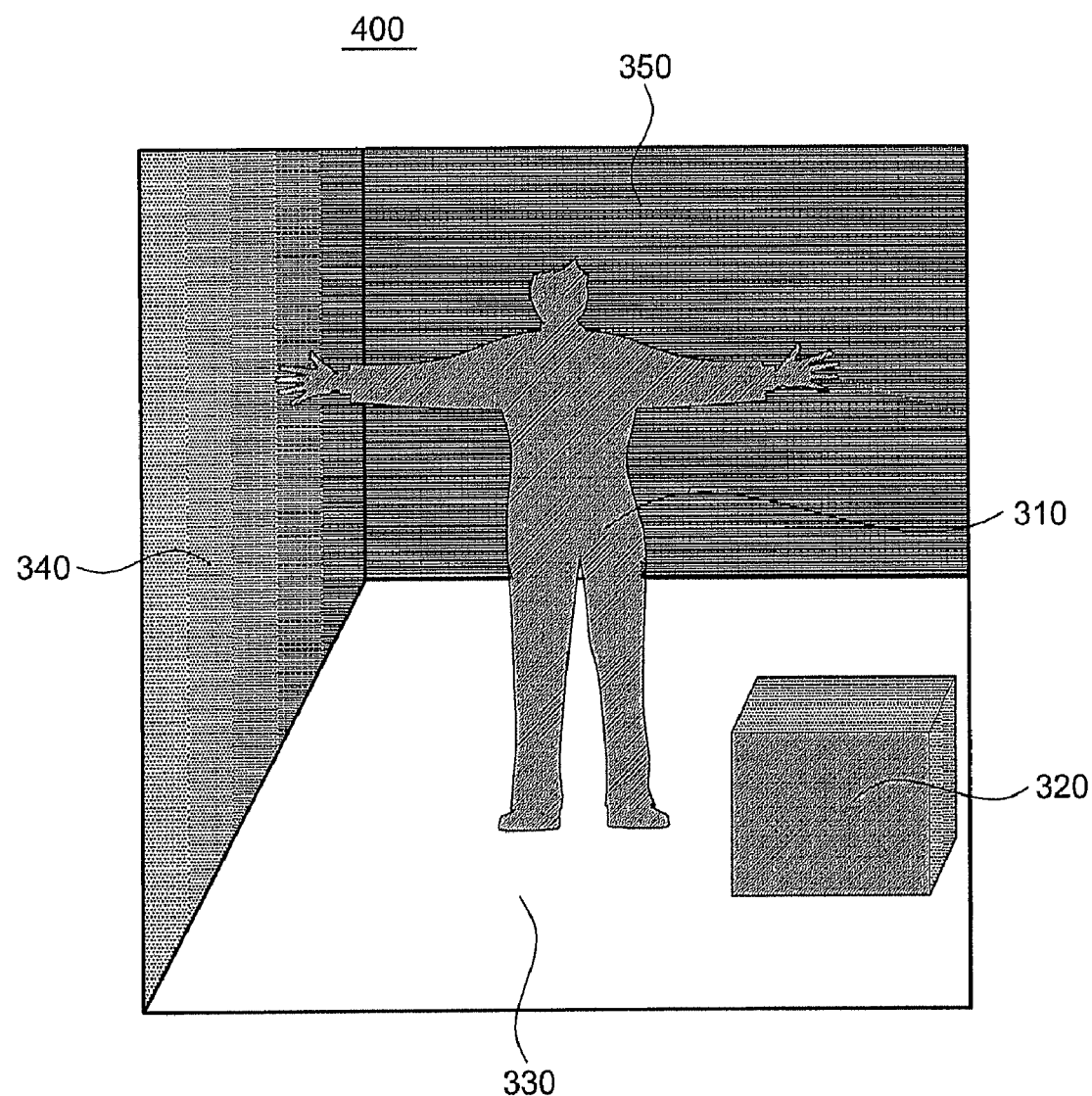
FIG. 4 illustrates a result of removing a floor area corresponding to a horizontal plane from the input depth image of FIG. 3 according to example embodiments.

FIG. 4 illustrates a result 400 of removing the floor area 330 corresponding to a horizontal plane from the input depth image 300 of FIG. 3 according to example embodiments.

The floor removing unit 121 may select at least three pixels from a bottom area of the input depth image 300.

It is highly probable that the bottom area of the depth image 300 corresponds to a floor portion of an object space.

Each of the selected at least three pixels may have coordinate values x, y, and z representing 3D spatial coordinates of an object from a camera. Specifically, each of the selected at least three pixels may have a three-dimensional (3D) coordinate value.

Accordingly, a plane equation may be calculated using the at least three pixels. The floor removing unit 121 may select a plurality of pixel sets based on noise of pixels of the input depth image 300, obtain plane equations with respect to the respective pixel sets, and then may obtain a more accurate plane equation representing them. The above process is referred to as a plane estimation process.

When the plane equation is obtained, the floor removing unit 121 may select and remove pixels included in the floor area 330 by referring to 3D coordinates of each of the pixels of the input depth image 300.

Whether a specific pixel belongs to the floor area 330 may be determined by calculating a distance between a point representing a 3D position of the specific pixel and a plane represented by the plane equation.

Within the 3D space, an inner product between a position vector of the point and a normal vector of the plane may become the distance between the point and the plane. However, this is only an example and thus the distance between the point and the plane may be calculated using various types of schemes.

Using the aforementioned scheme, the floor removing unit 121 may calculate a distance from the plane with respect to each of the entire pixels of the input depth image 300, and determine pixels of which the calculated distance is less than a predetermined threshold belong to the floor area 330 and then may remove the pixels from the input depth image 300.

When the floor area 330 is removed, the depth value filtering unit 122 may extract candidate areas of the silhouette area 310 of the target object by separating an un-removed area into a plurality of individual areas. It will be further described with reference to FIG. 5.

Figure 5:
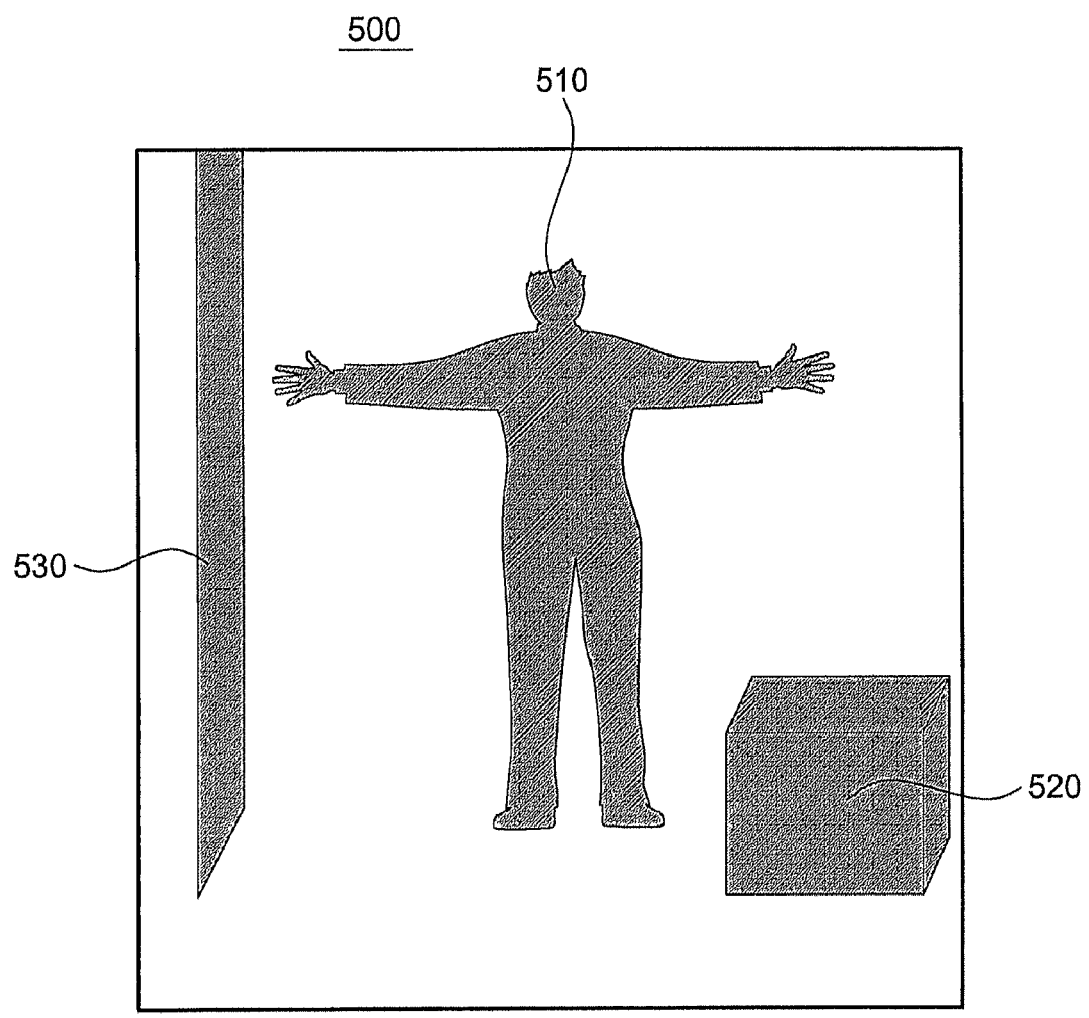
FIG. 5 illustrates a result of extracting three silhouette candidate areas of the target object from the input depth image of FIG. 4 according to example embodiments.

FIG. 5 illustrates a result 500 of extracting three silhouette candidate areas 510, 520, and 530 of the target object from the input depth image 300 of FIG. 4 according to an embodiment.

The depth value filtering unit 122 may remove, from the result 400 of FIG. 4, remaining pixels excluding pixels having a depth value greater than or equal to a first threshold and less than a second threshold.

For example, when the first threshold is 2.5 m and the second threshold is 3.5 m, only pixels having a depth value greater than or equal to 2.5 m and less than 3.5 m may remain.

The input depth image 300 may be obtained using a time of flight (TOF) and the like. In this case, due to a physical characteristic of hardware, a depth folding area may be included.

In addition, due to a periodicity of infrared waveforms emitted from a depth camera to obtain the input depth image 300, the same depth value may repeated at predetermined distances, for example, at the distance of every 7.5 m. For example, a depth value of a position at the distance of 0.1 m, a depth value of a position at the distance of 7.6 m, a depth value of a position at the distance of 15.1 m, and the like may be the same. This is called a depth folding phenomenon.

According to example embodiments, the depth folding area removing unit 123 may compensate for a depth folding area from the input depth image 300 or the result 400 of FIG. 4 where the floor area 330 is removed. For example, the depth folding area removing unit 123 may determine an area having an intensity value less than a predetermined intensity threshold corresponding to a depth folding area, based on an intensity image that may be generated by a depth camera during a depth image generation process, and then may uniformly compensate for depth values of pixels within the determined area.

According to another embodiment, the depth value filtering unit 122 may remove pixels having a depth value less than the first threshold and greater than or equal to the second threshold and then the depth folding area removing unit 123 may further remove, from the remaining pixels, pixels having an intensity value less than a predetermined intensity threshold.

Through the above process, three silhouette candidate areas 510, 520, and 530 may be extracted from the input depth image 300.

The silhouette extractor 124 may select an actual silhouette area of the target object, for example, the silhouette area 510 from the silhouette candidate areas 510, 520, and 530.

The silhouette extractor 124 may select, as the silhouette area of the target object, a silhouette candidate having a largest number of pixels, that is, a largest area among the silhouette candidate areas 510, 520, and 530 of the target object. In general, when the target object such as a human body is photographed for the purpose of creating a 3D model or an avatar, the target object may be photographed to have a large size.

Together with the above scheme, or instead of the above scheme, the silhouette extractor 124 may select, as the silhouette area of the target object, a silhouette candidate area closest to a central point of the input depth image 300 among the three silhouette candidate areas 510, 520, and 530 of the target object. It may be highly probable that the target object is positioned at the center of a photograph angle to create the input depth image 300.

Figure 6:
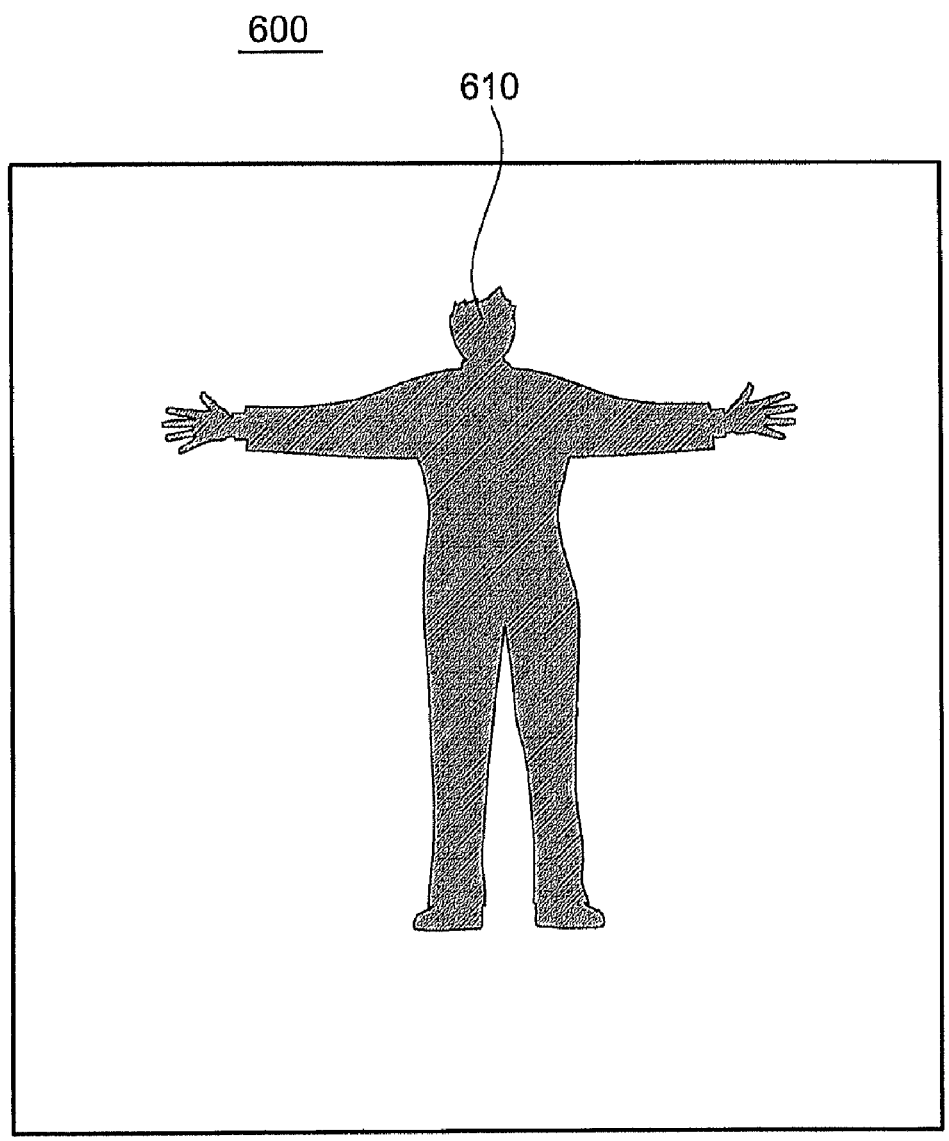
FIG. 6 illustrates a result of selecting a silhouette area of a target object from the three silhouette candidate areas of the target object of FIG. 5 according to example embodiments.

FIG. 6 illustrates a result 600 of selecting a silhouette area 610 of a target object from the three silhouette candidate areas 510, 520, and 530 of the target object of FIG. 5 according to example embodiments.

Generally, the silhouette area 610 of the target object may well reflect the target object. However, due to constraints of hardware such as a low resolution, a depth folding phenomenon, noise, and the like, and due to a depth value distortion caused by infrared rays emitted from an object, the selected silhouette area 610 of the target object may have some errors.

For example, among portions of a human body, a portion such as hair may absorb a relatively large amount of infrared rays and thus a hair portion may have a depth value greater than an actual depth value in the input depth image 300.

It can be seen that a large portion of the hair portion is removed from the silhouette area 610 of the target object.

In the case of edge portions of the silhouette area 610 of the target object, some errors may exist. For example, a portion of pixels corresponding to the wall area 350 or the floor area 330 of the input depth image 300 of FIG. 3 may be included in the silhouette are 610, or another portion of pixels corresponding to the target object area 310 may be removed.

The second calculator 130 may compensate for the errors by refining the silhouette area 610 of the target object.

The above process will be further described with reference to FIG. 7.

Figure 7:
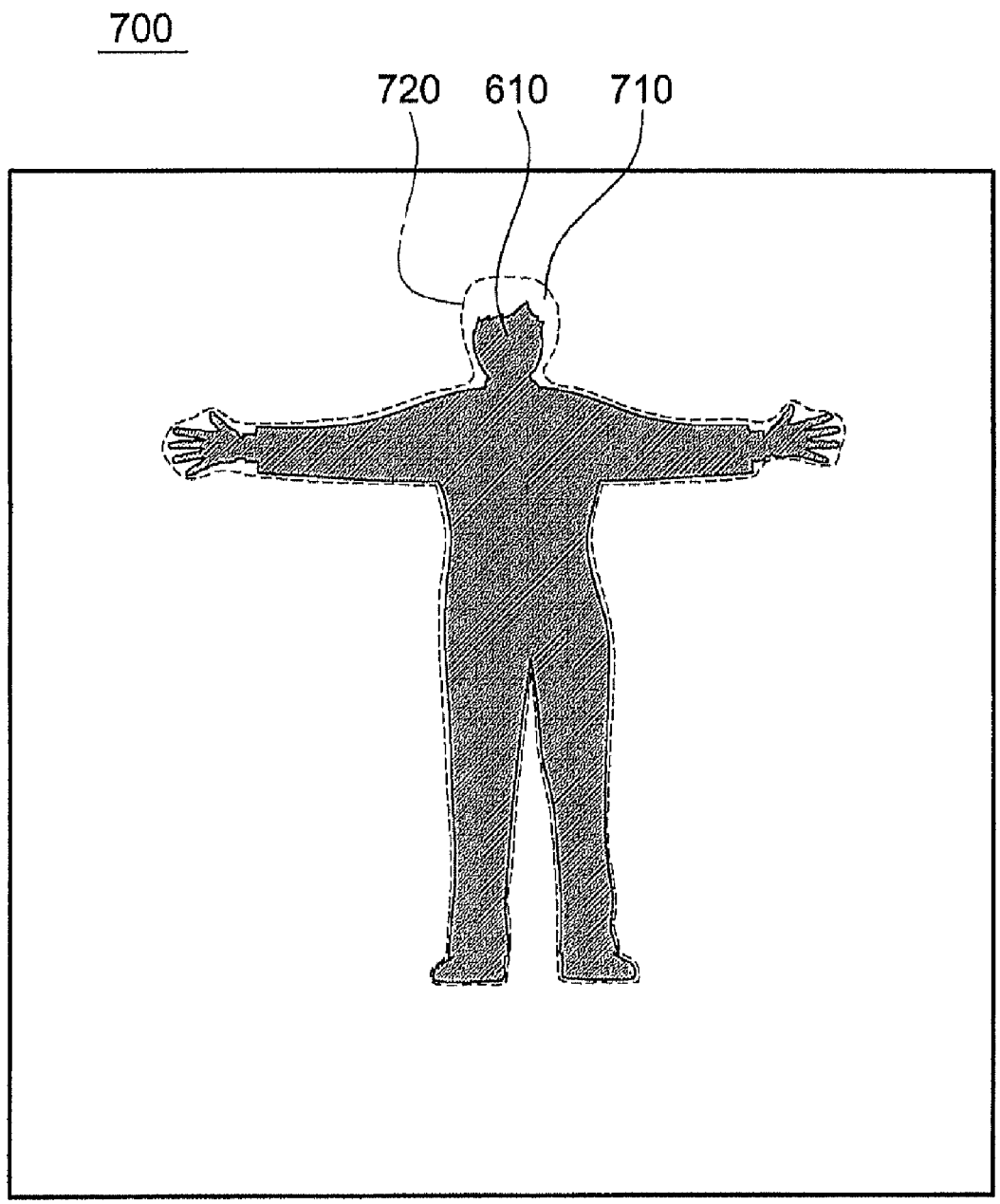
FIG. 7 illustrates a result of generating an extended silhouette area of the target object by merging adjacent pixels of the silhouette area of the target object of FIG. 6 to the silhouette area of the target object according to example embodiments.

FIG. 7 illustrates a result 700 of generating an extended silhouette area 720 of the target object by merging adjacent pixels 710 of the silhouette area 610 of the target object of FIG. 6 according to example embodiments.

The silhouette extender 131 may merge pixels of which a distance from a corresponding edge of the silhouette area 610 of the target object is less than a predetermined threshold distance.

The predetermined threshold distance may be set to be uniform with respect to the entire portion, and may also be set to be greater with respect to a top portion having a relatively high probability to correspond to a hair portion.

A process of extending the silhouette area 610 of the target object by merging the adjacent pixels 710 is referred to as a silhouette dilation process. The extended silhouette area 720 of the target object may be generated through the silhouette dilation process.

Figure 8:
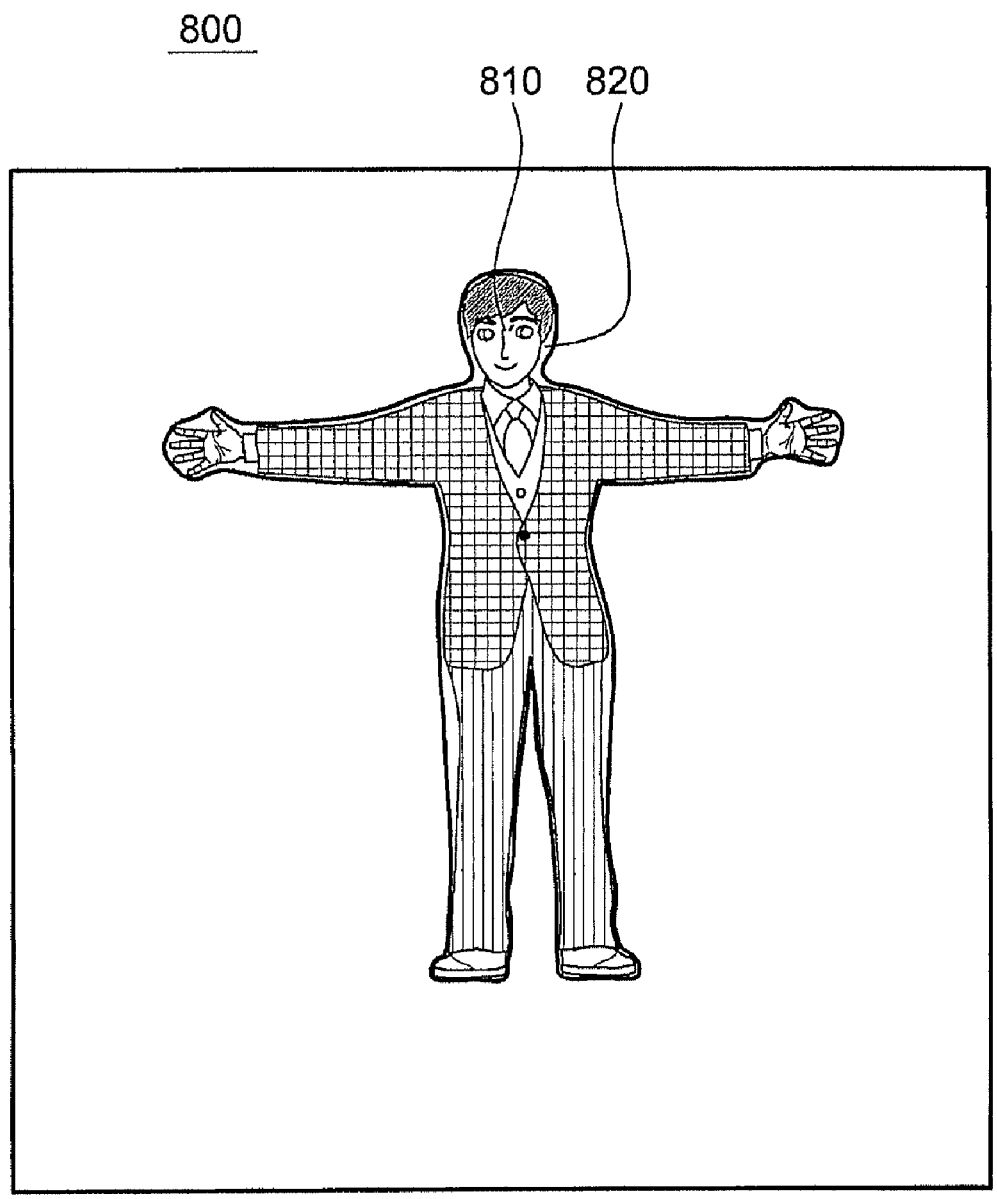
FIG. 8 illustrates a result of indicating, in the input color image of FIG. 2, a portion corresponding to the extended silhouette area of the target object of FIG. 7.

FIG. 8 illustrates a result 800 of indicating, in the input color image 200 of FIG. 2, a portion corresponding to the extended silhouette area 720 of the target object of FIG. 7.

Referring to FIG. 8, a portion 810 corresponding to an actual target object is shown and a portion 820 not corresponding to the actual target object is shown.

Hereinafter, a process of extracting the portion 810 corresponding to the target object by the second calculator 130 will be described with reference to FIGS. 9 and 10.

Figure 9:
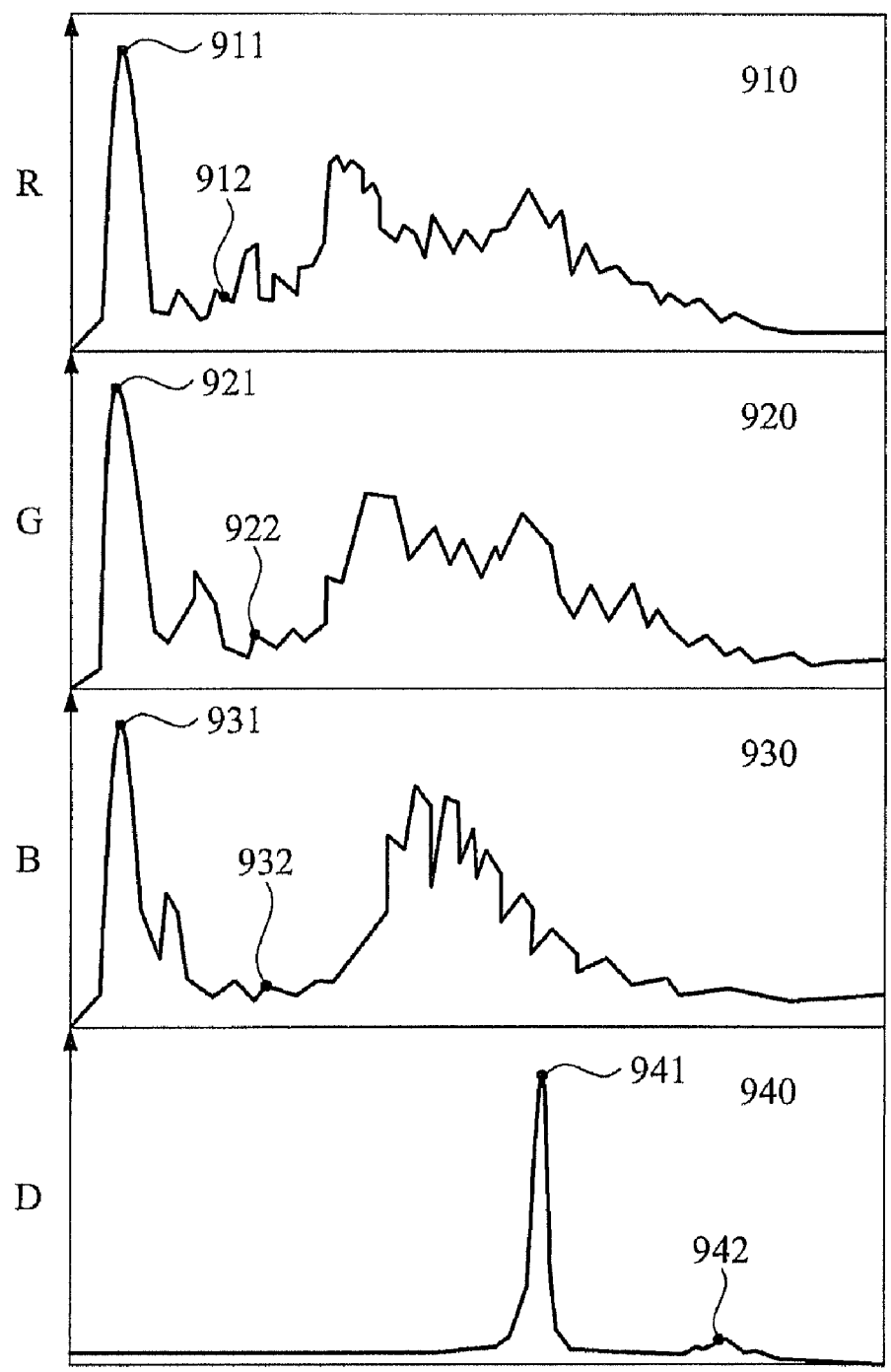
FIG. 9 illustrates histograms of a depth value distribution with respect to the extended silhouette area of the target object of FIG. 7 and a histogram of a color value distribution with respect to the area of FIG. 8 according to example embodiments.

FIG. 9 illustrates histograms 910, 920, and 930 of a depth value distribution with respect to the extended silhouette area 720 of the target object of FIG. 7 and a histogram 940 of a color value distribution with respect to the area of FIG. 8 according to example embodiments.

Hereinafter, a color value of each pixel may be analyzed with respect to three red (R), green (G), and blue (B) channels, based on an RGB color system. However, it is only an example and thus the color value may be analyzed based on other color systems, for example, YCbCr, hue, saturation, value (HSV), and the like.

The histogram 910 relates to an R channel value among color values of the area of FIG. 8. An x-axis corresponds to R channel value of pixels and a y-axis corresponds to a number of pixels or to a value obtained by normalizing the number of pixels as a probability distribution.

Similarly, the histogram 920 relates to a G channel value and the histogram 930 relates to a B channel value.

The histogram 940 relates to a depth value distribution within the extended silhouette area 720 of the target object.

The histograms 910, 920, 930, and 940 may be generated by the histogram generator 132 of FIG. 1. The probability calculator 133 may calculate a probability that each of entire pixels included in the portions 810 and 820 of FIG. 8 may belong to the target object, by referring to the histograms 910, 920, 930, and 940.

The target object area extractor 134 may select pixels having the calculated probability greater than or equal to a threshold probability, and may extract a target object area including the selected pixels.

In this example, when a value of a specific pixel corresponding to a hair portion of the target object is analyzed, the specific pixel may correspond to a point 911 in the histogram 910, may correspond to a point 921 in the histogram 920, may correspond to a point 931 in the histogram 930, and may correspond to a point 941 in the histogram 940. Specifically, it may be highly probable that the specific pixel belongs to the target object.

However, when a value of another pixel corresponding to a background area is analyzed, the other pixel may correspond to a point 912 in the histogram 910, may correspond to a point 922 in the histogram 920, may correspond to a point 932 in the histogram 930, and may correspond to a point 942 in the histogram 940. Specifically, it may be less probable that the other pixel belongs to the target object.

When a threshold probability value is appropriately set based on the above difference, only pixels belonging to the actual target object may be selected.

The post-processor 135 may perform various types of post-processing operations with respect to the selected pixels, for example, removing an outlier, filling a hole, a low pass filtering, a band pass filtering, and the like. A more natural and excellent result may be achieved.

Figure 10:
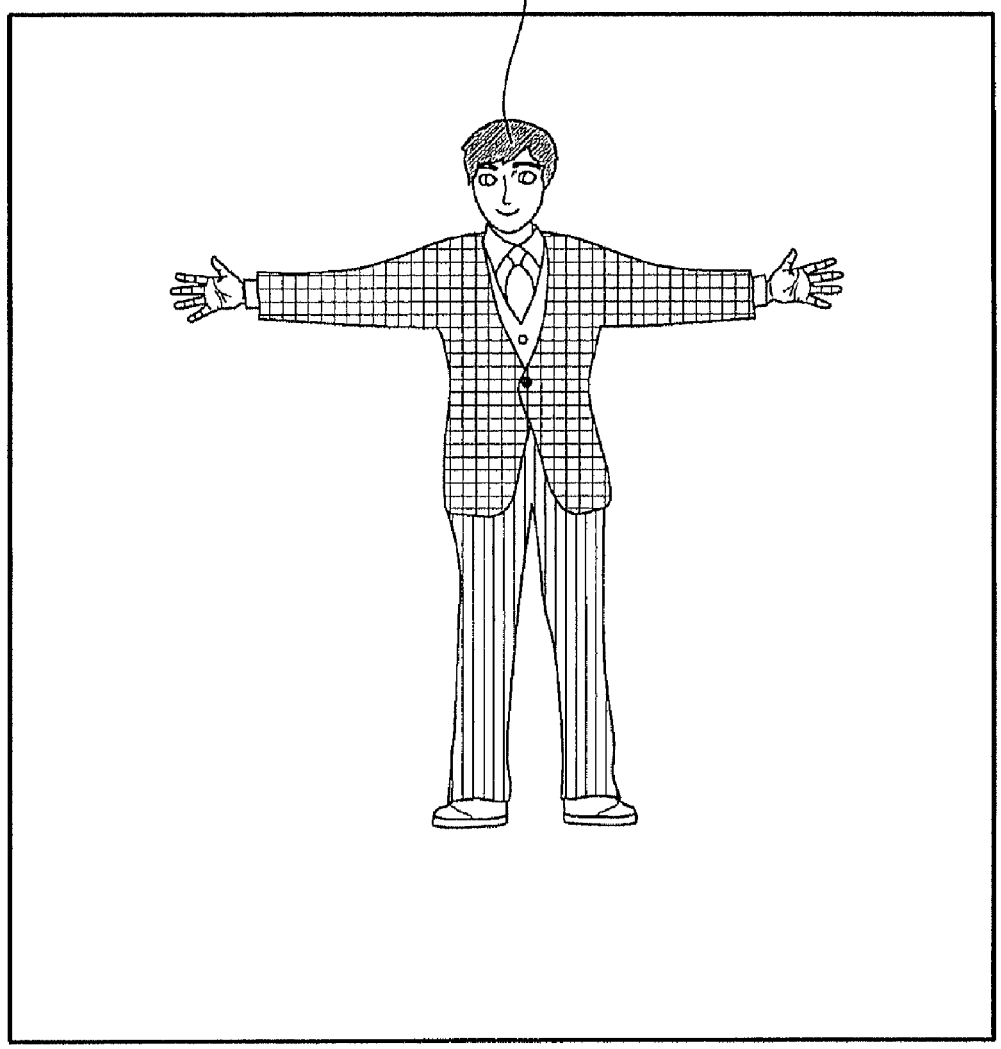
FIG. 10 illustrates a result of extracting a target object area from the input color image of FIG. 2 by referring to the histograms of FIG. 9.

FIG. 10 illustrates a result 1000 of extracting a target object area 1010 from the input color image 200 of FIG. 2 by referring to the histograms 910, 920, 930, and 940 of FIG. 9.

As described above, the target object area 1010 is extracted based on one piece of the input color image 200 and one piece of the input depth image 300 matched with the input color image 200.

Compared to a target object area extracted by performing a color value segmentation using only the input color image 200, or a target object area extracted by performing a depth value segmentation using only the input depth image 300, the above process may achieve an enhanced quality.

Compared to conventional schemes of segmenting a user body portion, the aforementioned scheme is inexpensive and has a high processing rate.

Figure 11:
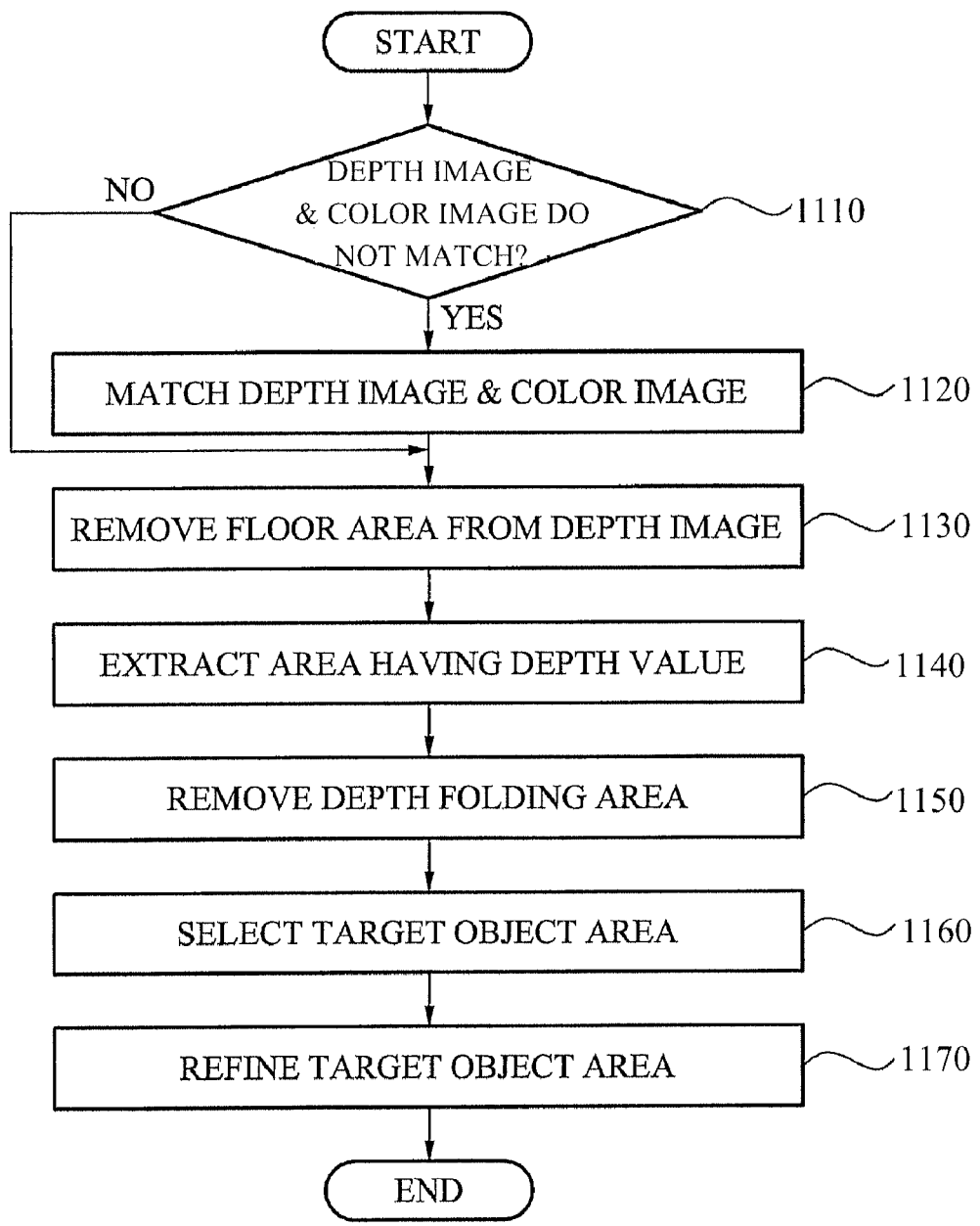
FIG. 11 illustrates an image processing method according to example embodiments.

FIG. 11 illustrates an image processing method according to example embodiments.

When a depth image and a color image are input, it is determined whether to perform matching of the depth image and the color image in operation 1110. When the depth image matches with the color image, the matching operation is not required (NO in 1110) and operation 1130 may be immediately performed.

However, when matching is performed (YES in 1110), the image matching unit 110 of the image processing apparatus 100 may match the depth image and the color image in operation 1120. The image matching operation is described above with reference to FIG. 3 and further description related thereto will be omitted here.

In operation 1130, the floor removing unit 121 may remove, from the depth image, a floor area that is a horizontal plane. In this instance, at least three pixels may be selected from a bottom portion of the depth image, and a plane equation may be obtained using the selected at least three pixels. A distance value between a point represented by spatial coordinates of a corresponding pixel and a plane represented by the plane equation may be obtained with respect to each of pixels of the depth image. Pixels of which the calculated distance is less than a threshold distance may be determined to belong to the floor area and be removed. This operation is described above with reference to FIG. 4.

In operation 1140, the depth value filtering unit 122 may remove pixels having a depth value outside a first range. The first range may be greater than or equal to a first threshold and less than a second threshold. This operation is described above with reference to FIG. 5.

In operation 1150, the depth folding area removing unit 123 may remove a depth folding area, for example, an area having an intensity value less than a predetermined intensity threshold within an intensity image. This operation is described above with reference to FIG. 5.

A plurality of silhouette candidate areas of a target object, for examples, the silhouette candidate areas 510, 520, and 530 of FIG. 5 may be extracted.

In operation 1160, the silhouette extractor 124 may select, as a silhouette area of the target object, one of the silhouette candidate areas of the target object.

An operation of the silhouette extractor 124 is described above with reference to FIGS. 5 and 6.

In operation 1170, the second calculator 130 may refine the extracted silhouette area of the target object.

Operation 1170 will be further described with reference to FIG. 12.

Figure 12:
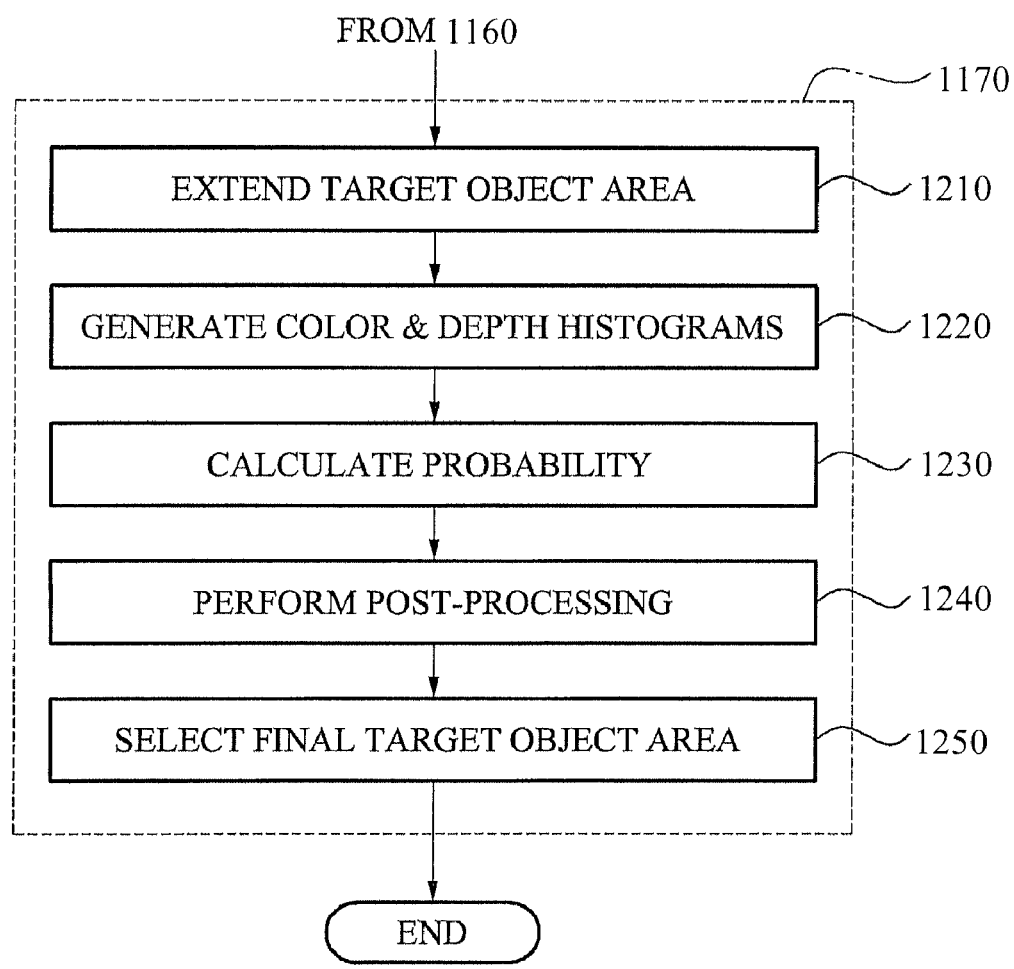
FIG. 12 illustrates an operation of refining an extracted silhouette area of a target object of FIG. 11.

FIG. 12 illustrates operation 1170 of FIG. 11.

In operation 1210, the silhouette extractor 131 may generate an extended silhouette area of the target object by merging adjacent pixels of the silhouette area of the target object. Operation 1210 is described above with reference to FIG. 7.

In operation 1220, the histogram generator 132 may generate a histogram of depth values of pixels within the extended silhouette area of the target object and histograms of color pixels of a portion corresponding to an actual target object.

A process of generating the histograms is described above with reference to FIG. 9.

In operation 1230, the probability calculator 133 may calculate a probability that a corresponding pixel belongs to the target object based on the histograms with respect to each of the pixels included in the portion of FIG. 8.

The target object area extractor 134 may select pixels that are determined to belong to the target object area based on the calculated probability.

In operation 1240, the post-processor 135 may perform various types of post-processing operations, which are described above with reference to FIG. 10.

In operation 1250, a final target object area may be extracted.

The above process is described with reference to FIG. 10.

The image processing method according to the above-described embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it should be appreciated by those skilled in the art that changes may be made in these embodiments without departing from the principles and spirit of the disclosure, the scope of which is defined by the claims and their equivalents.

What is claimed is:

1. An image processing apparatus, comprising:
   a first calculator to extract a silhouette area of a target object from an input depth image; and
   a second calculator to refine the silhouette area based on an input color image matching with the input depth image, and to extract a target object area from the input color image based on the refined silhouette area.

2. The image processing apparatus of claim 1, wherein the target object corresponds to a human body.

3. The image processing apparatus of claim 1, wherein the first calculator comprises:
   a floor removing unit to remove, from the input depth image, pixels corresponding to a horizontal plane;
   a depth value filtering unit to extract at least one silhouette candidate area of the target object by extracting, from the input depth image in which the pixels corresponding the horizontal plane are removed, an area having a depth value greater than or equal to a first threshold and less than a second threshold; and a silhouette extractor to select a silhouette area of the target object from the at least one silhouette candidate area of the target object.

4. The image processing apparatus of claim 3, wherein the floor removing unit estimates the horizontal plane by selecting at least three pixels from a bottom portion of the input depth image to obtain an equation of the horizontal plane, and removes, from total pixels of the input depth image, pixels of which a distance from the horizontal plane is less than a third threshold.

5. The image processing apparatus of claim 3, wherein the silhouette extractor selects, as the silhouette area of the target object, a silhouette candidate area having a largest number of pixels among the at least one silhouette candidate area of the target object.

6. The image processing apparatus of claim 3, wherein the silhouette extractor selects, as the silhouette area of the target object, a silhouette candidate area being closest to a central point of the input depth image among the at least one silhouette candidate area of the target object.

7. The image processing apparatus of claim 3, wherein the first calculator further comprises:

a depth folding removing unit to remove, from the extracted at least one silhouette candidate area of the target object, a portion having an intensity value less than a fourth threshold, by referring to an input intensity image corresponding to the input depth image.

8. The image processing apparatus of claim 1, wherein the second calculator comprises:

a silhouette extender to generate an extended silhouette area of the target object by merging pixels of which a distance from outer pixels of the silhouette area of the target object is less than a fifth threshold;

a histogram generator to calculate a color distribution of pixels corresponding to the extended silhouette area of the target object among pixels of the input color image, and to calculate a depth distribution of pixels corresponding to the extended silhouette area of the target object among pixels of the input depth image;

a probability calculator to calculate a probability that each of pixels constituting the extended silhouette area of the target object belongs to the target object, based on the color distribution and the depth distribution; and a target object area extractor to extract the target object area from the input color image based on the calculated probability.

9. The image processing apparatus of claim 8, further comprising:

a post-processor to refine the extracted target object area.

10. The image processing apparatus of claim 1, further comprising:

an image matching unit to match the input depth image and the input color image when the input depth image and the input color image do not match.

11. An image processing method, comprising:

extracting, using a processor, a silhouette area of a target object from an input depth image; and refining the silhouette area based on an input color image matching with the input depth image, and extracting, by the processor, a target object area from the input color image based on the refined silhouette area.

12. The image processing method of claim 11, wherein the extracting of the silhouette area comprises:

removing, from the input depth image, pixels corresponding to a horizontal plane;

extracting at least one silhouette candidate area of the target object by extracting, from the input depth image in which the pixels corresponding the horizontal plane are removed, an area having a depth value greater than or equal to a first threshold and less than a second threshold; and selecting a silhouette area of the target object from the at least one silhouette candidate area of the target object.

13. The image processing method of claim 12, wherein the selecting comprises selecting, as the silhouette area of the target object, a silhouette candidate area having a largest number of pixels among the at least one silhouette candidate area of the target object.

14. The image processing method of claim 12, wherein the selecting comprises selecting, as the silhouette area of the target object, a silhouette candidate area being closest to a central point of the input depth image among the at least one silhouette candidate area of the target object.

15. The image processing method of claim 14, wherein the extracting of the target object area comprises:

generating an extended silhouette area of the target object by merging adjacent pixels to the silhouette area of the target object;

generating a color distribution histogram of pixels corresponding to the extended silhouette area of the target object among pixels of the input color image, and generating a depth distribution histogram of pixels corresponding to the extended silhouette area of the target object among pixels of the input depth image;

calculating a probability that each of pixels constituting the extended silhouette area of the target object belongs to the target object, based on the color distribution histogram and the depth distribution histogram; and extracting the target object area from the input color image based on the calculated probability.

16. The image processing method of claim 11, further comprising:

matching the input depth image and the input color image prior to the refining of the silhouette area when the input depth image and the input color image do not match.

17. At least one non-transitory computer readable medium comprising computer readable instructions that control at least one processor to perform a method, comprising:

extracting a silhouette area of a target object from an input depth image; and refining the silhouette area based on an input color image matching with the input depth image, and extracting a target object area from the input color image based on the refined silhouette area.

18. The at least one non-transitory computer readable medium comprising computer readable instructions that control at least one processor to perform the method of claim 17, wherein the method further comprises:

removing, from the input depth image, pixels corresponding to a horizontal plane;

extracting at least one silhouette candidate area of the target object by extracting, from the input depth image in which the pixels corresponding the horizontal plane are removed, an area having a depth value greater than or equal to a first threshold and less than a second threshold; and selecting a silhouette area of the target object from the at least one silhouette candidate area of the target object.

19. The at least one non-transitory computer readable medium comprising computer readable instructions that control at least one processor to perform the method of claim 18, wherein the selecting comprises selecting, as the silhouette area of the target object, a silhouette candidate area having a largest number of pixels among the at least one silhouette candidate area of the target object.

20. The at least one non-transitory computer readable medium comprising computer readable instructions that control at least one processor to perform the method of claim 18, wherein the selecting comprises selecting, as the silhouette area of the target object, a silhouette candidate area being closest to a central point of the input depth image among the at least one silhouette candidate area of the target object.

* * * * *

UNITED STATES PATENT AND TRADEMARK OFFICE
CERTIFICATE OF CORRECTION

PATENT NO. : 8,355,568 B2  
APPLICATION NO. : 12/844242  
DATED : January 15, 2013  
INVENTOR(S) : Byong Min Kang et al.

Page 1 of 1

It is certified that error appears in the above-identified patent and that said Letters Patent is hereby corrected as shown below:

Title Page Col. 1 (Inventors); Line 2, Delete "Hwaesong-si" and insert -- Hwaseong-si --, therefor.

Signed and Sealed this  
Thirtieth Day of April, 2013

Teresa Stanek Rea  
*Acting Director of the United States Patent and Trademark Office*